No. 884,397. PATENTED APR. 14, 1908.
A. P. LORD & N. WILKINS.
OVERHEAD TROLLEY.
APPLICATION FILED JAN. 11, 1907.
2 SHEETS—SHEET 1.
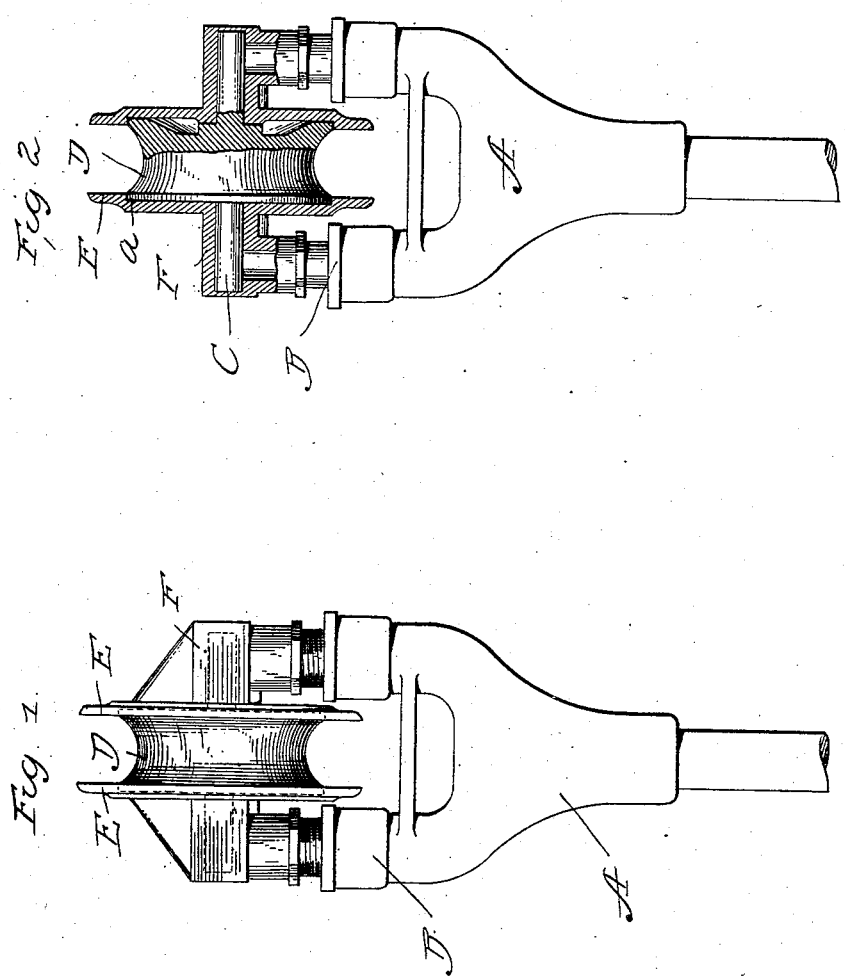

No. 884,397.
PATENTED APR. 14, 1908.
A. P. LORD & N. WILKINS.
OVERHEAD TROLLEY.
APPLICATION FILED JAN. 11, 1907.
2 SHEETS—SHEET 2.
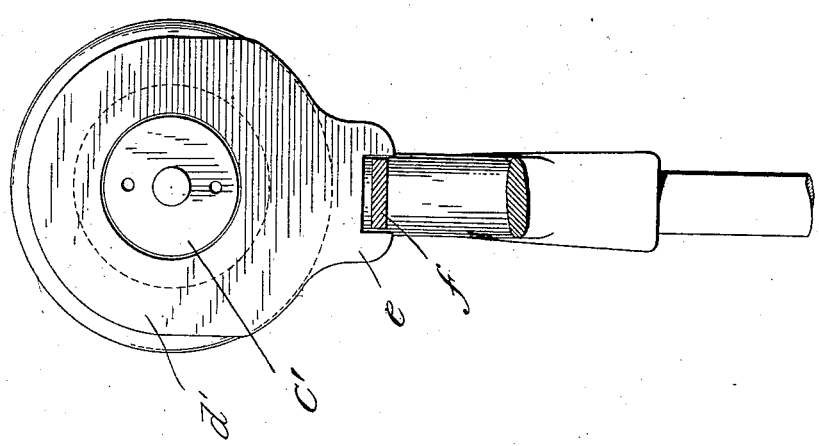
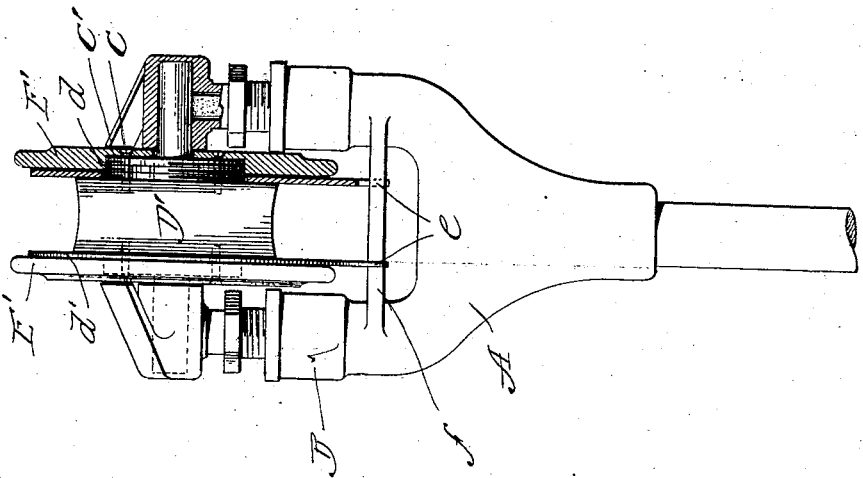

UNITED STATES PATENT OFFICE.

ALLEN P. LORD AND NATHANIEL WILKINS, OF BRADFORD, PENNSYLVANIA.

OVERHEAD TROLLEY.

No. 884,397.      Specification of Letters Patent.      Patented April 14, 1908.

Application filed January 11, 1907. Serial No. 351,896.

*To all whom it may concern:*

Be it known that we, ALLEN P. LORD and NATHANIEL WILKINS, citizens of the United States, residing at Bradford, Pennsylvania, have invented certain new and useful Improvements in Overhead Trolleys, of which the following is a specification.

Our invention relates to trolleys for electric railway lines, and is intended to prevent the displacement of the trolley from the wire. The rotation of the wheel has a tendency to throw the wire away from its periphery and thus disconnect or disengage it from contact with the trolley, and it is the object of the present invention to counteract or overcome this tendency.

In carrying out our invention we provide a moving part in the nature of the trolley or pulley now used, having the usual concave periphery and journaled to roll over the under surface of the wire, and, in connection with this rolling or moving part we utilize a fixed or stationary part which may be a part of the trolley itself or independent thereof, but so arranged as to counteract the centrifugal action of the roller as soon as the wire leaves the periphery and comes in contact with the stationary part, the stationary part interrupting and preventing the separating tendency and bringing the parts together in their normal position. Our experiments show that we not only prevent the frequent and annoying separation of the parts so common, but we make a material saving in the expenditure of power by reason of the fact that the contact between the trolley and wire is practically constant.

In the accompanying drawing, Figure 1 is an elevation of a trolley head; Fig. 2 a section of the same; Fig. 3 is a view of a modication, and Fig. 4 a side view of the modified form.

The fork or arm supporting the trolley wheel may be of any ordinary or improved construction and is shown at A. The bifurcated portions B may serve as receptacles for a lubricant to keep well oiled the journal C of the trolley wheel. In our improved construction we make the wheel and flanges separate, as shown in Fig. 2. The wheel is in the form of a grooved pulley D, while the flanges, ordinarily made integral with the wheel shown at E, are stationary and are made preferably integral with the journal box F. The flanges are recessed, as shown at $a$, to receive the sides of the pulley and thus prevent the accumulation of dirt or sediment which would cause undue wear between the moving and stationary parts. The effect of this construction is that just as soon as the wire begins to separate from the pulley or the pulley from the wire, by reason of the rapid rotation of the pulley, the wire comes in contact with the stationary flanges which instantly checks the separating action, with the result that the parts are brought together again in their normal position and thus the frequent separation so common in the constructions in use is avoided.

It may be found desirable to have the flanges supported so as to rotate so as to lessen the drag or friction in crossing the switches and to provide for this we have produced the modified construction, shown in Figs. 3 and 4. In this case the pulley shown at D' has attached to it, so as to move therewith the flanges E', these flanges being screwed on, as shown at $d$, to screw threaded projections extending laterally from the pulley and are prevented from unscrewing by the pins $c$. Interposed between the flanges and the periphery of the pulley are sheet metal plates $d'$, which fit over the projections $c'$ and are held in place by the flanges E', and are prevented from rotating by extensions $e$, which engage a cross-bar $f$ on the frame. This construction, as in the construction first described, gives a stationary part adjacent to the grooved periphery of the pulley and will have the same effect.

It will be observed that the pulley D has a very shallow groove. The purpose of this slight depression is that when running on a tangent the wire will run in the center of the pulley and thus be prevented from rubbing against the stationary side flanges. In deep groove trolley wheels the tendency is for the wire to climb up the sides and have constant movement up and down, thereby losing a considerable percentage of its power by reason of the fact that it is so much out of contact. In our use of a shallow groove we find that the wire is kept constantly and steadily with little or no vibration in the bottom of the trolley wheel and thus we secure a maximum of power by constant contact.

What we claim is:—

A trolley wheel comprising a rotatable center having a shallow groove, non-rotatable plates located on opposite sides of said rotatable center and maintaining the wire in said shallow groove, and rotatable circular disks located on opposite side of said non-rotatable plates and having their edges projecting slightly beyond the non-rotatable plates, substantially as described.

In testimony whereof, we affix our signatures in presence of two witnesses.

ALLEN P. LORD.
NATHANIEL WILKINS.

Witnesses:
Thos. J. Wilson,
G. W. Simpson.